United States Patent
Potter

(10) Patent No.: US 8,921,697 B2
(45) Date of Patent: *Dec. 30, 2014

(54) CABLE PROTECTOR SYSTEMS AND METHODS RELATING THERETO

(76) Inventor: Michael Todd Potter, Greenville, SC (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/458,479

(22) Filed: Apr. 27, 2012

(65) Prior Publication Data

US 2012/0211277 A1     Aug. 23, 2012

Related U.S. Application Data

(62) Division of application No. 12/540,570, filed on Aug. 13, 2009, now Pat. No. 8,168,888.

(60) Provisional application No. 61/096,827, filed on Sep. 14, 2008.

(51) Int. Cl.
*H02G 3/30*     (2006.01)
*H02G 3/34*     (2006.01)
*H02G 3/04*     (2006.01)

(52) U.S. Cl.
CPC .............. *H02G 3/34* (2013.01); *H02G 3/0475* (2013.01)
USPC ......................................... 174/99 R; 59/78.1

(58) Field of Classification Search
USPC ............... 174/99 R, 19, 97, 95, 101; 59/78.1; D13/155
See application file for complete search history.

(56) References Cited

U.S. PATENT DOCUMENTS

| | | | |
|---|---|---|---|
| 4,672,805 A | 6/1987 | Moritz | |
| 4,801,764 A | 1/1989 | Ohlhaber | |
| 5,900,586 A * | 5/1999 | Carr | ................................. 174/95 |
| 6,029,437 A * | 2/2000 | Hart | .................................. 59/78 |
| 6,787,702 B2 | 9/2004 | Suzuki | |
| 6,940,019 B2 | 9/2005 | Ikeda et al. | |
| 7,145,079 B1 | 12/2006 | Henry | |
| 8,168,888 B2 * | 5/2012 | Potter | .......................... 174/99 R |
| 2007/0144778 A1 | 6/2007 | Henry | |
| 2007/0248412 A1 | 10/2007 | Lubanski | |

* cited by examiner

*Primary Examiner* — Chau N Nguyen
(74) *Attorney, Agent, or Firm* — Thomas C. Saitta

(57) ABSTRACT

In accordance with one embodiment of the present disclosure, a cable protector system is provided. The system includes a first component, the first component comprising a top surface, a bottom surface, and two opposing ends. The first component defines a channel extending between the two opposing ends. The system also comprises a second component, the second component being substantially identical to the first component. When the first and second components are coupled, each of the top surfaces are substantially coplanar and each of the bottom surfaces are substantially coplanar and the channels together define a single channel extending between the first component and second component. The channel is configured to receive at least one cable.

10 Claims, 5 Drawing Sheets

CABLE PROTECTOR SYSTEMS AND METHODS RELATING THERETO

This application is a divisional application of U.S. patent application Ser. No. 12/540,570, filed Aug. 13, 2009, now allowed, claiming the priority of U.S. Provisional Patent Application Ser. No. 61/096,827, filed Sep. 14, 2008, which is incorporated by reference herein.

BACKGROUND

Cables can extend across flooring surfaces in office environments, public spaces, conference facilities, construction sites, and the like. Numerous devices and methods have been developed in an attempt to protect cables from physical damage while also minimizing the risk of pedestrian traffic tripping or falling as a result of such cables.

For example, tape is often used to hold cables in place. Not only is tape unattractive, but it is largely ineffective and leaves tape residue on cables and flooring surfaces.

Cable covers exist but such cable covers are either designed for permanent installation or have very limited adjustability. For example, many cable covers are made from rubber or similar materials and are only available in straight sections of various lengths. Such covers are not very portable and are difficult to use in situations where the cables being utilized are not straight or must be bent or curved. Other covers are formed from plastic pieces that interlock together but, again, the main sections are straight with the only option of adjustment involving utilization of 45 degree bend components to change direction.

Thus, there is an ongoing need for a portable cable cover system that can be easily adjusted. Methods relating to such a system would also be desirable.

SUMMARY

In accordance with one embodiment of the present disclosure, a cable protector system is provided. The system includes a first component, the first component comprising a top surface, a bottom surface, and two opposing ends. The first component defines a channel extending between the two opposing ends. The system also comprises a second component, the second component being substantially identical to the first component. Each opposing end, respectively, of the first component is configured to pivotally and removably couple with an opposing end of the second component and each opposing end, respectively, of the second component is configured to pivotally and removably couple with an opposing end of the first component. When the first and second components are coupled, each of the top surfaces are substantially co-planar and each of the bottom surfaces are substantially co-planar and the channels together define a single channel extending between the first component and second component. The channel is configured to receive at least one cable.

In another embodiment of the present disclosure, a cable protector system is provided. The system includes a plurality of components, each component comprising a top surface, a bottom surface, and two opposing ends. Each component defines a channel extending between the two opposing ends. Each opposing end, respectively, of each component is configured to pivotally and removably couple with an opposing end of another component such that when components are coupled, each of the top surfaces are substantially co-planar and each of the bottom surfaces are substantially co-planar and the channels together define a single channel extending between the components. The channel is configured to receive at least one cable.

In still another embodiment of the present disclosure, a method of utilizing a cable protector system is provided. The method includes positioning the cable protector system on a surface. The system comprises a first component and a second component. The first component comprises a top surface, a bottom surface, and two opposing ends. The first component defines a channel extending between the two opposing ends. The second component is substantially identical to the first component. Each opposing end, respectively, of the first component is configured to pivotally and removably couple with an opposing end of the second component and each opposing end, respectively, of the second component is configured to pivotally and removably couple with an opposing end of the first component. When the first and second components are coupled, each of the top surfaces are substantially co-planar and each of the bottom surfaces are substantially co-planar and the channels together define a single channel extending between the first component and second component. The channel configured to receive at least one cable. The first component and second component are coupled. A cable is inserted in the channel defined by the first component and second component.

Other features and aspects of the present disclosure are discussed in greater detail below.

BRIEF DESCRIPTION OF THE DRAWINGS

A full and enabling disclosure, including the best mode thereof, directed to one of ordinary skill in the art, is set forth more particularly in the remainder of the specification, which makes reference to the appended figures in which.

Figure 1:
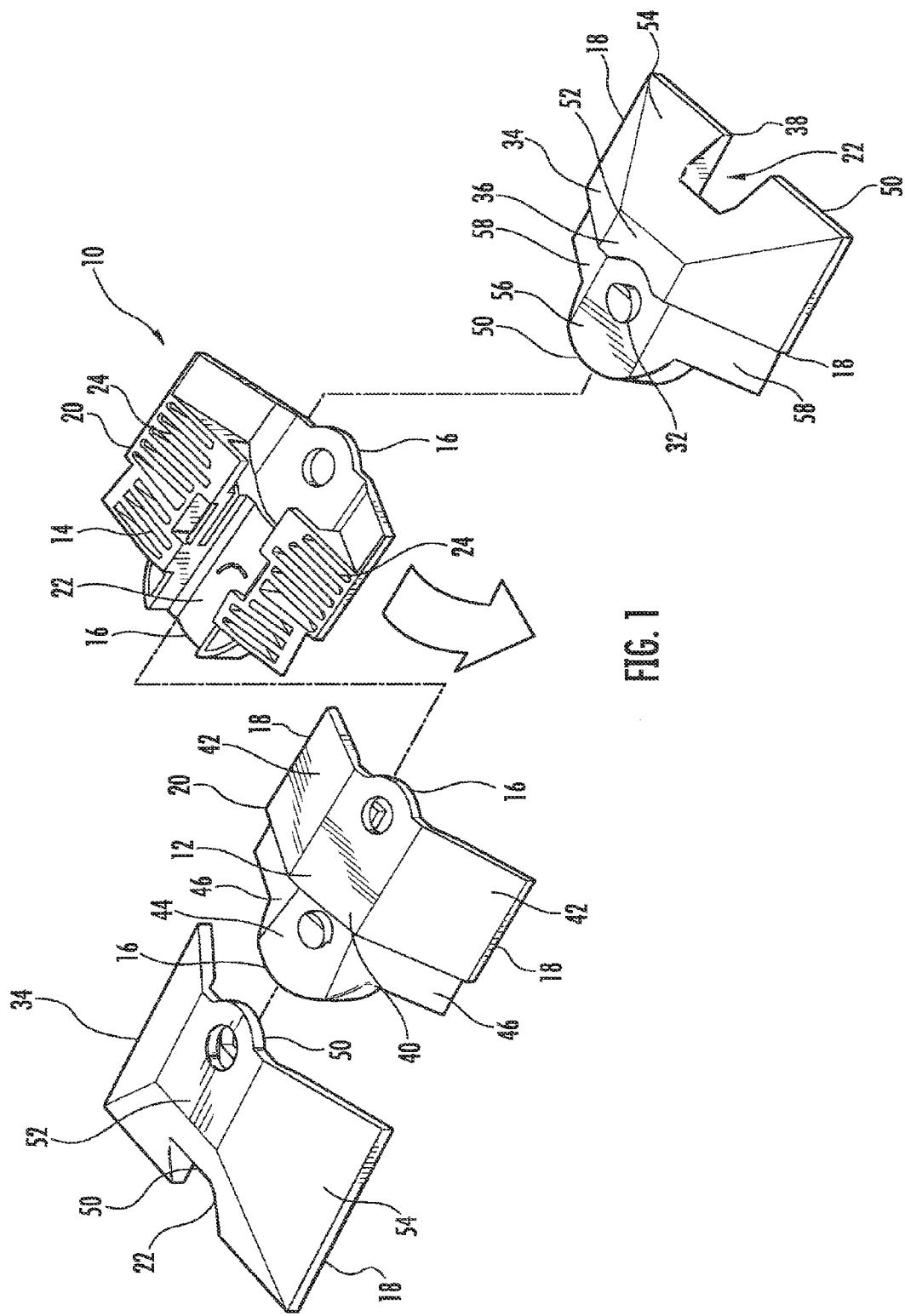
FIG. 1 illustrates components of a system in accordance with certain embodiments of the present disclosure.

Repeat use of reference characters in the present specification and drawings is intended to represent same or analogous features or elements of the disclosure.

DETAILED DESCRIPTION

Reference now will be made in detail to various embodiments of the disclosure, one or more examples of which are set forth below. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment, can be used on another embodiment to yield a still further embodiment. Thus, it is intended that the present disclosure covers such modifications and variations as come within the scope of the appended claims and their equivalents.

The present disclosure is generally directed to a cable protector system. The system of the present disclosure can advantageously articulate and pivot in different directions to permit the system to be utilized in a wide variety of applications. In addition, the system can be coiled into a circle with the cables maintained therein permitting easy transport of both the cables and the system.

Referring to FIG. 1, a system 10 in accordance with the present disclosure is illustrated. The system includes two or more components 20. As illustrated, each component 20 is substantially identical. However, as discussed in further detail herein, components 20 are not necessarily always substantially identical and can be different shapes and sizes in accordance with the present disclosure. The components can be any suitable length and width. For instance, in certain embodiments, each component has a length of from about 1 inch to about 3 inches and a width of from about 1 inch to about 3 inches. Again, however, it should be appreciated that the components of the present disclosure can be scaled up or down in accordance with the desired application of the same. Any number of individual components 20 can be utilized depending on the length of cable sought to be covered.

The components can be formed from plastic, such as a molded plastic, or any other suitable material as would be understood in the art. In addition, the components can be made in any suitable colors. Colors can be selected to compliment the flooring surface on which the system will be positioned. Alternatively, the components can be formed in bright colors to draw attention from pedestrians. For instance, in industrial or construction applications, the components can be formed in alternating yellow and black colors. Colors can be applied using any mechanism as would be known in the art. Colors can be incorporated into the forming process as the components are made or, alternatively, the colors can be applied or painted onto the components after the components are formed. In addition, decals or the like can be applied to components indicating some type of information, such as the type of cable present therein, or adding colors or designs as desired.

As seen in FIG. 1, each component 20 includes a top surface 12, a bottom surface 14, and two opposing ends 16. The top surface 12 can include a generally flat portion 40 with two side surfaces 42 extending therefrom that slope downward toward sides 18 so that top surface 12 has a generally wedge shape that permits pedestrians to easily walk on system 10. In addition, the sloped sides 42 of top surface 12 can permit wheels to easily roll over system 10.

The top surface 12 can further include a second flat portion 44 that is in a different plane from the first flat portion 40 and that includes two side surfaces 46 extending therefrom that slope downward toward sides 18. Second flat portion 44 can be lower than first flat portion 40 and can assist in coupling components as discussed further herein.

Bottom surface 14 is generally flat. Bottom surface 14 defines a channel 22 that extends between the two opposing ends 16. The channel 22 can be any suitable width and depth so as to accommodate one or more cables. In this regard, cables contemplated for use with the present disclosure include any cable as would be known in the art including but not limited to AC power cable, RCA-type cable, DC power cable, telephone cable, USB cable, optical cable, S-video cable, DVI cable, HDMI cable, component video cable, Cat-5 cable, composite video cable, XLR audio cable, coaxial cable, and combinations thereof. However, the term cable as used herein is intended to encompass any length of material that could be covered by the systems described herein. For example, and without limitation, such lengths of materials can also include wires, hoses, conduits, pneumatic tubing, plumbing, or the like.

In addition, bottom surface 14 defines slots 24. The slots 24 are designed to prevent the components 20 from sliding when placed on a surface, such as a carpeted surface. In addition to slots 24, other features can be added to bottom surface 14 or incorporated into bottom surface 14 to assist in preventing movement of system 10.

Figure 2A:
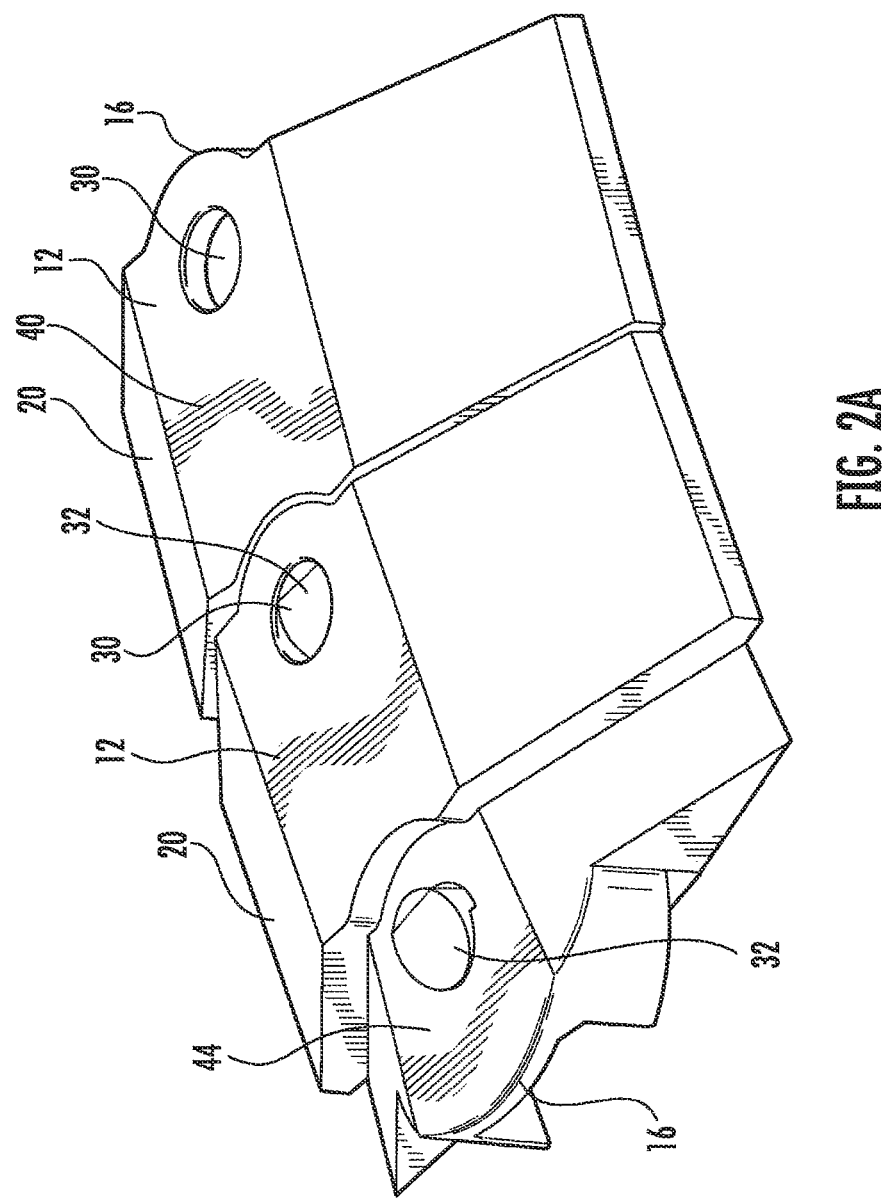
FIGS. 2A and 2B illustrate components of a system in accordance with certain embodiments of the present disclosure.
Figure 2B:
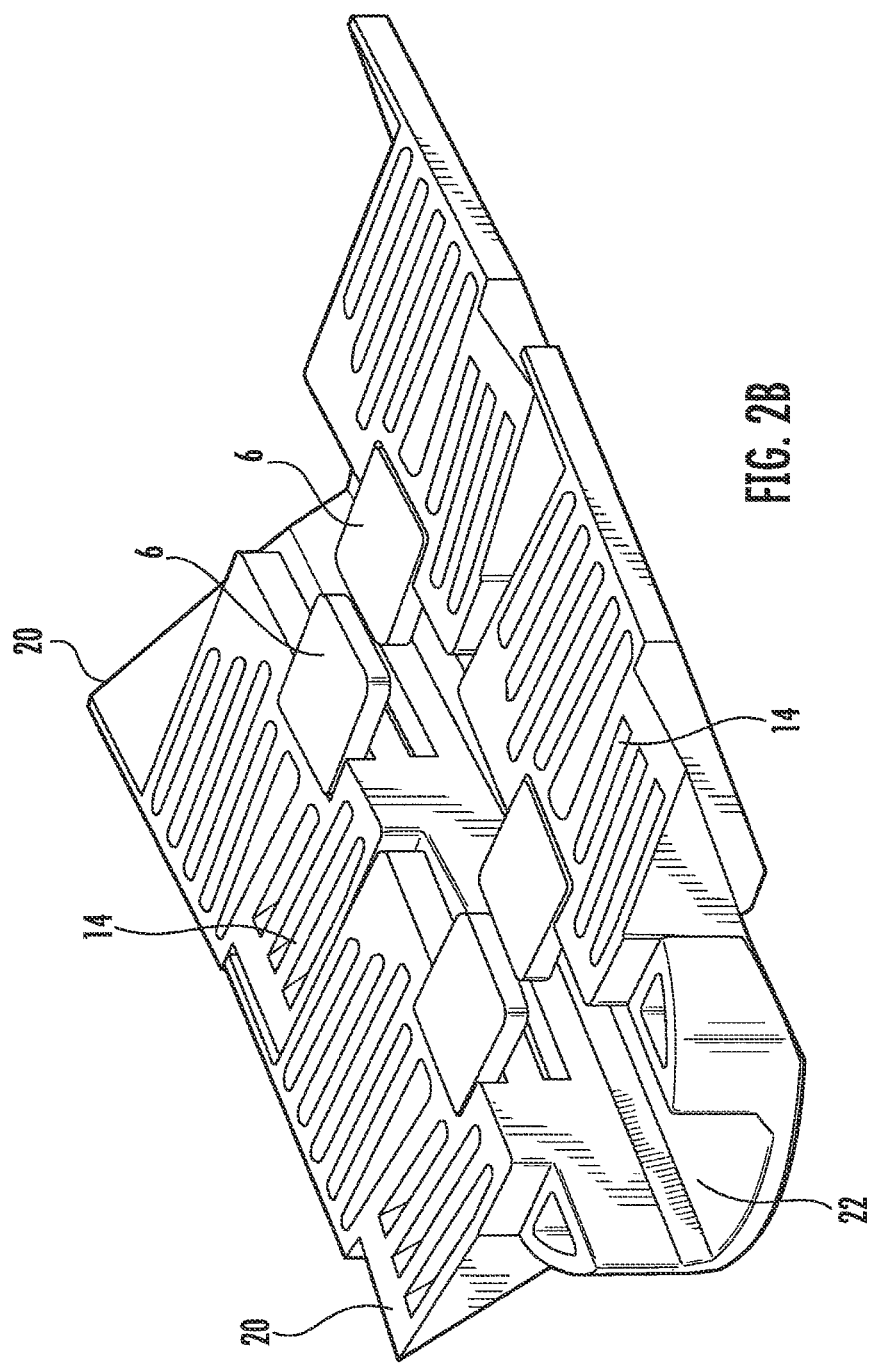

For instance, referring to FIG. 2B, clip 6 can be utilized to hold cables in channel 22. Bottom surface 14 can define openings into which clip 6 can be inserted. However, clips can be held in place by any suitable mechanism as would be known in the art such as adhesives, fasteners, or the like. One or more clips 6 can be utilized. As illustrated, two clips 6 are positioned on opposite sides of channel 22. Clip 6 can be made of rubber or any other suitable material and can assist in preventing movement of system 10 on a surface. In other embodiments, other suitable clips can be utilized. For example, one or more clips can be integrally formed as part of bottom surface 14 or depending on the size or thickness of the cables, a more robust material such as metal can be selected for the clips.

Turning to FIGS. 2A and 2B, two components 20 are illustrated coupled to one another. FIG. 2A illustrates the top surfaces of the two components while FIG. 2B illustrates the bottom surfaces. Two components coupled together can be any suitable length depending on the length of the individual components. For instance, in certain embodiments, two components 20 coupled together have a length of from about 2 inches to about 6 inches, and more particularly about 4.5 inches. In the illustrated embodiment, top surface 12 defines an opening 30 at one end of opposing ends 16 and the other end defines a tab 32. The opening 30 of the component 20 can be any suitable shape or size to accommodate the tab 32 (which can similarly be any suitable shape or size) of another component 20 so as to removably couple the components 20. In the illustrated embodiments, the components can be removably joined by a snap-fit type of configuration whereby the tab 32 can be depressed by a user to disconnect the components 20, if necessary. In this manner, one end 16 of each component 20 is utilized to couple the components 20 leaving the other end also free to couple yet another component 20, making the system infinitely scalable. However, it will be appreciated that any number of suitable linking mechanisms are contemplated by the present disclosure. For instance, any number of suitable connectors can be utilized including tongue-and-groove connectors or the like.

In certain embodiments, such as that illustrated, the opening 30 is defined in first flat portion 40 and the tab is defined by second flat portion 44, which is in a different plane from first flat portion 40. In this manner, the flat portion 40 of one component overlaps with the second flat portion 44 of another component. This design allows an opening 30 from one component 20 to easily snap together with another component 20.

When coupled, each of the top surfaces 12 of the components 20 are substantially co-planar and each of the bottom surfaces 14 are substantially co-planar and the channels 22 together define a single channel extending between the components 20. Importantly, the components 20 are configured to pivot in relation to one another when the components 20 are coupled. As illustrated, the components 20 are configured to pivot horizontally in relation to one another such that the components are capable of pivoting from side to side. In this regard, each component is capable of pivoting at an angle of from about 1 degree to about 25 degrees with respect to another component. More particularly, each component is capable of pivoting at an angle of from about 1 degree to about 20 degrees with respect to another component.

Figure 3A:
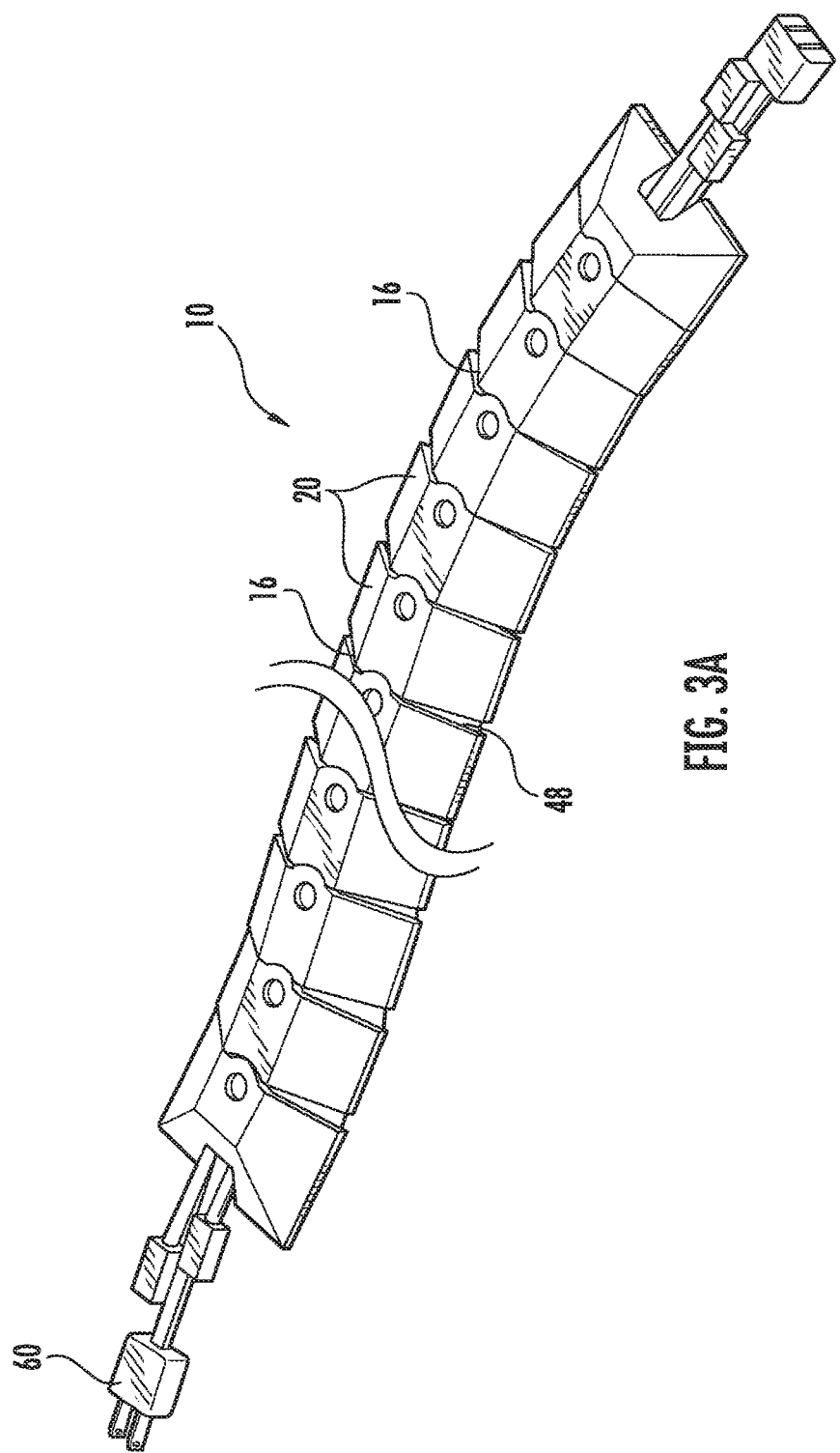
FIGS. 3A and 3B illustrate components of a system in accordance with certain embodiments of the present disclosure.

Referring to FIG. 3A, the angle of pivot can be adjusted depending on the mechanism of coupling selected. For instance, in the illustrated embodiments, each of the opposing ends 16 of each component 20 are curved. Depending on the degree and size of the curve, the pivot angle of the components can be changed. However, the range of pivot described and illustrated has been determined to be advantageous because it has been determined that such a range provides the desired degree of pivot while still maintaining sufficient space between the components with cable 60 present therein. For example, exposed space 48 is of minimal size so as to prevent the tip from a high heel shoe from getting stuck therein.

Figure 3B:
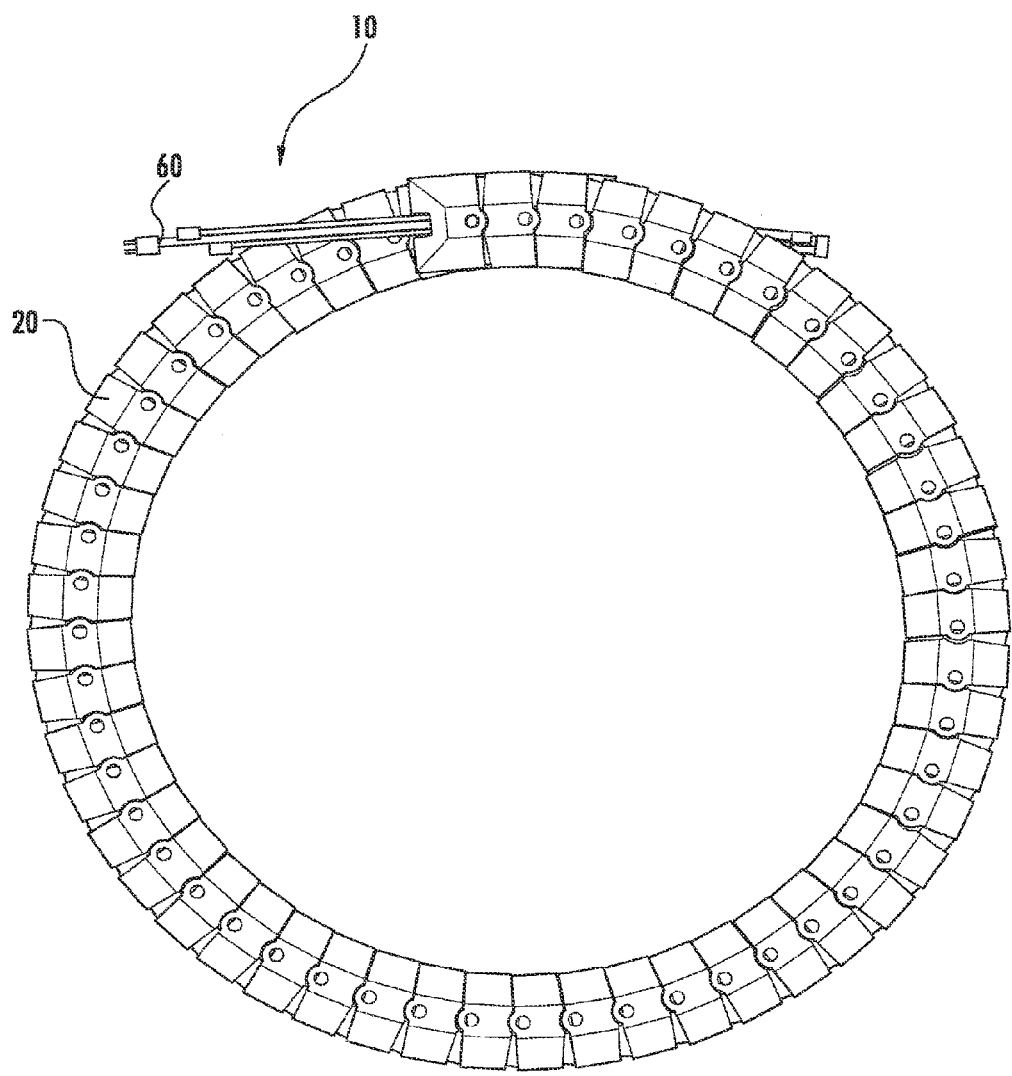

In addition, the angle of pivot allows the components to pivot into a complete circle. Referring to FIG. 3B, a system of the present disclosure is illustrated in which the components 20 are coiled into a circle. As illustrated, the components 20 are also configured to pivot vertically in relation to one another such that the components are capable of flexing ever so slightly so as to allow them to gradually rise when the components are coiled in a circle. The components 20 are configured to stack on top of one another so that circle can increase in height. In this manner, the components can be stored with one or more cables 60 still present within the system. The component can be designed so that the circle has a suitable diameter. For example, the circle can have a diameter of from about 1 feet to about 4 feet, more particularly a diameter of from about 2 feet to about 3 feet. Again, however, it will be appreciated that the diameter can be adjusted depending on the application.

In addition to the components previously described, the systems of the present disclosure can also utilize one or more end components or end caps 34. Referring again to FIG. 1, the one or more end caps 34 can be utilized to provide a sloped surface to the end portion of the system. The end cap 34 includes a top surface 36, a bottom surface 38, and two opposing ends 50. The bottom surface 38 defines a channel 22 extending between the two opposing ends 50. The top surface 36 can include a generally flat portion 52 with three side surfaces 54 extending therefrom that slope downward toward sides 18 and one of the opposing ends 50 so that top surface 36 has a generally wedge shape that permits pedestrians to easily walk on system 10. In addition, the sloped sides 54 of top surface 12 can permit wheels to easily roll over system 10. Also, one of the three side surfaces can define an opening allowing cable to exit from channel 22.

The top surface 36 can further include a second flat portion 56 that is in a different plane from the first flat portion 52 and that includes two side surfaces 58 extending therefrom that slope downward toward sides 18. Second flat portion 56 can be lower than first flat portion 40 and can assist in coupling components as explained previously with respect to components 20 and as illustrated in FIG. 2.

As with components 20, the top surface 36 can define a tab 32 in second flat portion 56 to join the end cap 34 with a component 20. Alternatively, or in combination, it can define an opening 30 in first flat portion 52. In this manner, end component 34 can couple with either side of component 20. Again, however, it will be appreciated that any number of suitable linking mechanisms are contemplated by the present disclosure.

In addition to end cap 34, any number of other components or modifications to components are contemplated by the present disclosure. By way of example, and not intending to be limited in any way, component 20 can be modified to define an opening in any suitable part of top surface 12. In this manner, if one cable of a bundle of cables only needs to be covered for part of a distance, it can be housed with the other cables until the point that it needs to be split from the other cables, in which case it can exit from an opening defined in the top surface 12. Such components 20 and end caps 34 can be provided in a kit that includes components of various shapes and sizes and types so that a system can be created by a user that is suitable for the application desired.

In order to utilize the systems of the present disclosure, a user can couple two or more of the components as previously described to form a system. One or more cables can be inserted into the channel defined by the system. The system can be positioned on a surface. If necessary, the system can be dismantled by removing the cable(s) from the channel and uncoupling the various components. Advantageously, the system does not require tools or great time or effort to install or disassemble.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure.

I claim:

1. A cable protector system comprising:
   the combination of a plurality of discrete components, each component comprising a top surface, a bottom surface, and two opposing ends;
   said top surface comprising two sloping side surfaces and a flat portion extending between said two sloping side surfaces;
   each component defining a channel extending between the two opposing ends;
   wherein each opposing end, respectively, of each component is configured to pivotally and releasably couple in contacting manner with an opposing end of another component such that when components are coupled, each of the bottom surfaces are substantially co-planar and the channels together define a single channel extending between the components, the channel configured to receive at least one cable;
   wherein said flat portion of each said top surface of each said component is a first flat portion,
   and wherein said top surface of each said component further comprises a second flat portion and two additional sloping side surfaces, said second flat portion being lower than said first flat portion.

2. The system of claim 1, wherein each said component further comprises an opening and a depressible tab, wherein said opening and tab are configured such that the tab of one component is received within the opening of another component when said components are coupled together, whereby said coupled components are separable when said tab is depressed.

3. The system of claim 1, wherein each said component further comprises an opening and a depressible tab, wherein said opening is positioned on said first flat portion and said tab is positioned on said second flat portion, and wherein said opening and said tab are configured such that the tab of one component is received within the opening of another component when said components are coupled together, whereby said coupled components are separable when said tab is depressed.

4. The system of claim 1, further comprising an end cap, said end cap comprising a top surface, a bottom surface, two opposing sides extending between said top surface and said bottom surface and two opposing ends;
said end cap top surface comprising a first flat portion, three sloping side surfaces extending from said first flat portion, a second flat portion lower than said first flat portion, and two sloping side surfaces extending from said second flat portion;
said end cap defining a channel extending between said two opposing end cap ends with said end cap top surface, said end cap being configured to removably couple with an opposing end of a component such that when coupled, each of said bottom surfaces are substantially co-planar and said channels together define a single channel extending between said end cap and said component, said channel configured to receive at least one cable.

5. A cable protector system comprising:
the combination of a plurality of discrete components, each component comprising a top surface, a bottom surface, and two opposing ends;
said top surface comprising two sloping side surfaces;
each component defining a channel extending between the two opposing ends;
wherein each opposing end, respectively, of each component is configured to pivotally and releasably couple in contacting manner with an opposing end of another component such that when components are coupled, each of the bottom surfaces are substantially co-planar and the channels together define a single channel extending between the components, the channel configured to receive at least one cable;
an end cap, said end cap comprising a top surface, a bottom surface, two opposing sides extending between said top surface and said bottom surface and two opposing ends,
said end cap top surface comprising three sloping side surfaces;
said end cap defining with said end cap top surface a channel extending between said two opposing end cap ends, said end cap being configured to removably couple with an opposing end of a component such that when coupled, each of said bottom surfaces are substantially co-planar and said channels together define a single channel extending between said end cap and said component, said channel configured to receive at least one cable.

6. A cable protector system comprising:
the combination of a plurality of discrete components, each component comprising a top surface, a bottom surface, and two opposing ends;
said top surface sloping downward on both sides and comprising a flat portion extending between two sloping side surfaces;
each component defining a channel extending between the two opposing ends;
wherein each opposing end, respectively, of each component is configured to pivotally and releasably couple in contacting manner with an opposing end of another component such that when components are coupled, each of the bottom surfaces are substantially co-planar and the channels together define a single channel extending between the components, the channel configured to receive at least one cable;
wherein said flat portion of each said top surface of each said component is a first flat portion,
and wherein said top surface of each said component further comprises a second flat portion and two additional sloping side surfaces, said second flat portion being lower than said first flat portion.

7. The system of claim 6, wherein each said component further comprises an opening and a depressible tab, wherein said opening and tab are configured such that the tab of one component is received within the opening of another component when said components are coupled together, whereby said coupled components are separable when said tab is depressed.

8. The system of claim 6, wherein each said component further comprises an opening and a depressible tab, wherein said opening is positioned on said first flat portion and said tab is positioned on said second flat portion, and wherein said opening and said tab are configured such that the tab of one component is received within the opening of another component when said components are coupled together, whereby said coupled components are separable when said tab is depressed.

9. The system of claim 6, further comprising an end cap, said end cap comprising a top surface, a bottom surface and two opposing ends;
said end cap top surface comprising a first flat portion, three sloping side surfaces extending from said first flat portion, a second flat portion lower than said first flat portion, and two sloping side surfaces extending from said second flat portion;
said end cap defining a channel extending between said two opposing end cap ends with said end cap top surface, said end cap being configured to removably couple with an opposing end of a component such that when coupled, each of said bottom surfaces are substantially co-planar and said channels together define a single channel extending between said end cap and said component, said channel configured to receive at least one cable.

10. A cable protector system comprising:
the combination of a plurality of discrete components, each component comprising a top surface, a bottom surface, and two opposing ends;
said top surface sloping downward on both sides;
each component defining a channel extending between the two opposing ends;
wherein each opposing end, respectively, of each component is configured to pivotally and releasably couple in contacting manner with an opposing end of another component such that when components are coupled, each of the bottom surfaces are substantially co-planar and the channels together define a single channel extending between the components, the channel configured to receive at least one cable;
an end cap, said end cap comprising a top surface, a bottom surface and two opposing ends,
said end cap top surface sloping downward on both sides;
said end cap defining with said end cap top surface a channel extending between said two opposing end cap ends, said end cap being configured to removably couple with an opposing end of a component such that when coupled, each of said bottom surfaces are substantially co-planar and said channels together define a single channel extending between said end cap and said component, said channel configured to receive at least one cable.

* * * * *